United States Patent [19]

Ogata et al.

[11] Patent Number: 5,017,202
[45] Date of Patent: May 21, 1991

[54] GAS TREATING APPARATUS

[75] Inventors: Hiromasa Ogata; Koji Morioka; Susumu Ohmori, all of Tokyo, Japan

[73] Assignees: Taikisha Ltd.; Toyo Boseki Kabushiki Kaisha, Tokyo, both of Japan

[21] Appl. No.: 337,390

[22] Filed: Apr. 13, 1989

[51] Int. Cl.[5] .............................................. B01D 39/00
[52] U.S. Cl. ...................................................... 55/390
[58] Field of Search .......................... 55/390; 165/8, 9

[56] References Cited

U.S. PATENT DOCUMENTS

| | | | |
|---|---|---|---|
| 2,639,000 | 5/1953 | Edwards | 55/390 |
| 3,361,193 | 1/1968 | Kritzler | 165/9 |
| 3,367,404 | 2/1968 | Johnson et al. | 165/9 |

FOREIGN PATENT DOCUMENTS 60-34991 10/1985 Japan .

*Primary Examiner*—Bernard Nozick
*Attorney, Agent, or Firm*—Gifford, Groh, Sprinkle, Patmore and Anderson

[57] ABSTRACT

A gas treating apparatus including a treating flow passage having a first opening and a second opening through which the gas passes to be treated; a pair of ducts for transporting the treatment-target gas or an element-refreshing gas through the treating flow passage positioned between a third opening and a fourth opening; and a rotary frame for radially supporting the treating flow passage and unidirectionally rotatable relative to the pair of ducts. At the upper and lower sides in the rotational direction of the third and fourth openings, there are provided first sealing members. As these sealing members come into sliding contact with at least one of the sealing faces at the upper and lower sides and at the sides of the first opening and of the second opening, the members provide gas sealing effect between the treating flow passage and the pair of ducts positioned between the third and fourth openings and in the vicinity of the same.

4 Claims, 6 Drawing Sheets

GAS TREATING APPARATUS

BACKGROUND OF THE INVENTION

1. Field of the Invention

The present invention relates to a gas treating apparatus for effecting a dehumidification treatment, deodorization treatment or a heat exchange treatment on a target gas by causing the gas to pass through an element block, and more particularly to a gas treating apparatus comprising: a treating flow passage 10c having a first opening 10a and a second opening 10b through which the gas passes to be treated; a pair of ducts 11 and 12 for transporting therethrough the treatment-target gas or an element-refreshing gas and respectively having a third opening f1 and a fourth opening f2 opposing to each other across the treating flow passage 10c; and a rotary frame 9 for radially supporting the treating flow passage 10c and unidirectionally rotatable relative to the pair of ducts 11 and 12.

2. Description of the Prior Art

Figure 8:
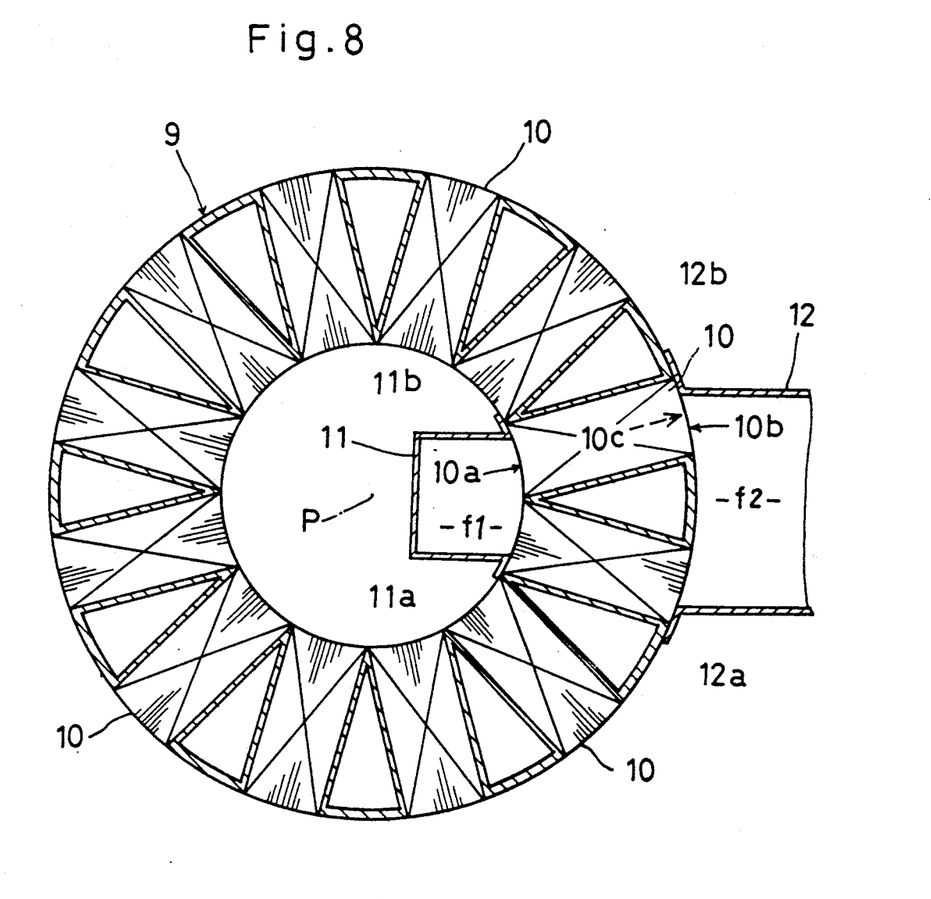
FIG. 8 is a section showing a conventional construction.

According to a known gas treating apparatus of the above-noted type, as shown in FIG. 8 for example, at the third and fourth openings f1 and f2 respectively of the ducts 11 and 12 adjacently opposing the first and second openings 10a and 10b of the element block 10, there are provided fixed sealing faces 11a, 11b, 12a and 12b formed with slopes so as to extend along an upper peripheral edge and a lower peripheral edge of the rotary frame 9 with respect to its direction of rotation, respectively. During the rotation of the rotary frame 9, these fixed sealing faces 11a, 11b, 12a and 12b of the ducts are constantly maintained in sliding contacts with the curved edges of the first and second openings 10a and 10b of the element block 10 such that the constant sliding contact provides an air-tight sealing between the ducts 11, 12 and the element block 10 (e.g. a Japanese utility model published under Showa No. 60-34991).

With the above construction; however, there occurs a significant frictional wear in the sliding contact portions of the ducts and block. Further, in order to obtain a good air-tightness, the curved first and second openings of the element block and the curved fixed sealing faces of the ducts must be formed and assembled with a high precision. For this reason, the prior construction has failed to achieve a desired air-tightness in spite of its manufacturing difficulty.

In addition, generally, the element block need be regularly and frequently exchanged for a new one. However, the block tends to be costly because of the above-described manufacturing precision difficulty of its first and second openings. Thus, if the block has to be exchanged frequently because of such significant frictional wear, this will increase the running costs of the treating system.

The primary object of the present invention is to provide a gas treating apparatus which provides a superior air-tightness and yet is easy and inexpensive to manufacture, assemble and run, the object being accomplished by providing the rotary frame with a novel and effective air-tight construction with respect to its rotational direction.

SUMMARY OF THE INVENTION

In order to achieve the above-noted object, according to a first characterizing feature of the invention, in a gas treating apparatus including: a treating flow passage having a first opening and a second opening through which the gas passes to be treated; a pair of ducts for transporting therethrough the treatment-target gas or an element-refreshing gas and respectively having a third opening and a fourth opening opposing to each other across the treating flow passage; and a rotary frame for radially supporting the treating flow passage and unidirectionally rotatable relative to the pair of ducts, the apparatus of the invention comprises: sealing faces formed substantially along rotatable faces of the first and second openings and positioned in the upper side and lower side of rotational direction of the third and fourth openings; a first sealing member disposed between an adjacent pair of the first openings and between an adjacent pair of the second openings; wherein the first sealing member comes into sliding contact with at least one of the sealing faces disposed at the upper and lower sides in said relative rotational direction and at the sides of the first opening and the second opening, thereby providing gas-tightness with respect to the relative rotational direction between the third and fourth openings and the treating flow passage and the pair of ducts disposed adjacent thereto.

With the above first characterizing feature of the invention, since the first and second openings of the gas treating flow passage do not come into sliding contact with the fixed sealing faces of the ducts, it becomes possible to avoid frictional wear in the element block having the gas flow passage and also to reduce the manufacturing precision required in the assembly of the element blocks to the rotary frame without sacrificing the integrity of the gas-tightness. Further, unlike the aforementioned prior art, such high manufacturing precision is no longer needed in the formation of the first and second openings of the gas flow passage, whereby it becomes possible to form the element block into a simpler configuration such as a rectangular or cylindrical shape which is easier to manufacture.

Preferably, according to a second characterizing feature of the invention, the first sealing member is formed of a lip-shaped elastic member.

With this second characterizing feature of the invention, the elastic deformation of the sealing member may advantageously offset manufacturing or assembly tolerances, if any, of the sealing faces of the ducts and the sealing members of the rotary frame. Accordingly, the sealing members and fixed sealing faces may be constantly maintained effectively sealed to each other through their sliding contacts, whereby the apparatus may maintain further superior gas-tightness in its rotational direction.

Consequently, according to the features of the invention, it has become possible to effectively prevent leakage of the treatment-target gas or the element-refreshing gas because of the superior gas-tightness established between the ducts and the gas treating flow passage in the rotational direction. Moreover, because of the simple construction, the manufacturing and assembly costs of the gas treating apparatus per se have been advantageously reduced.

Furthermore, because of the significantly reduced frictional wear in the element blocks, the element blocks need not be exchanged frequently. And, the element block has such simple construction as to lower its manufacturing costs. These effects, when combined, will significantly reduce the running costs of the apparatus.

BRIEF DESCRIPTION OF THE DRAWINGS

Accompanying drawings illustrate one preferred embodiment of the present invention; in which.

DESCRIPTION OF THE PREFERRED EMBODIMENTS

Preferred embodiments of the present invention will be particularly described hereinafter with reference to the accompanying drawings.

Figure 1:
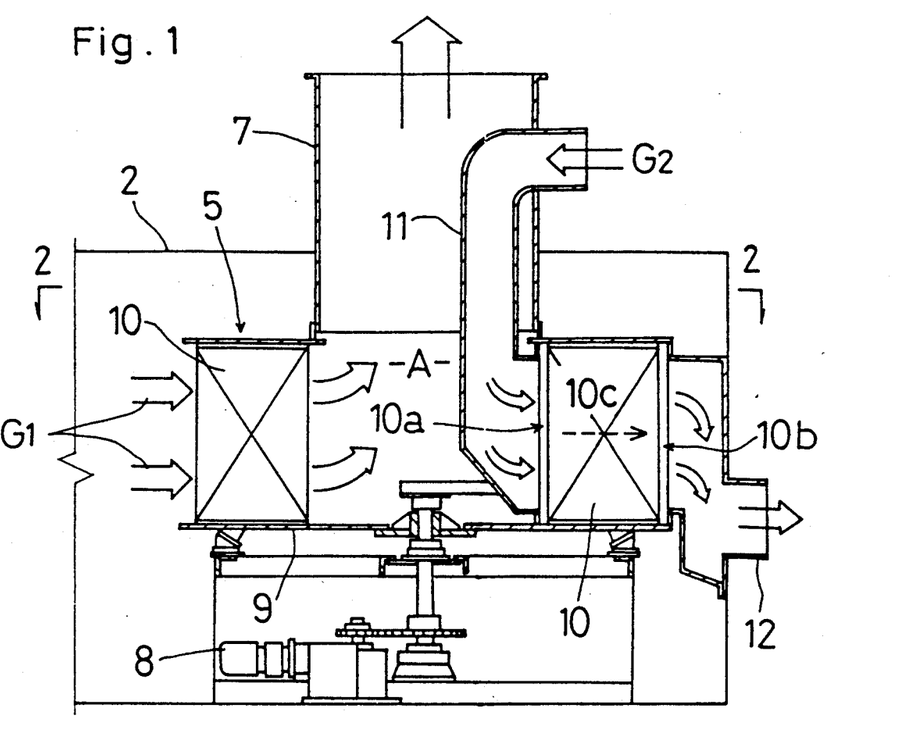
FIG. 1 is a vertical section.
Figure 2:
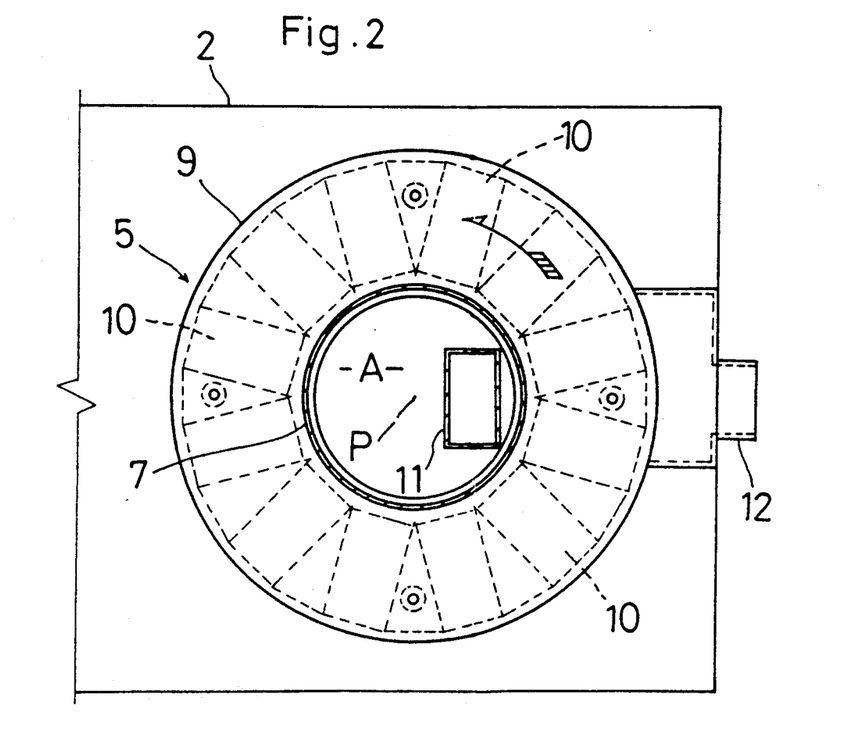
FIG. 2 is a section taken along a line 2—2 of FIG. 1.
Figure 3:
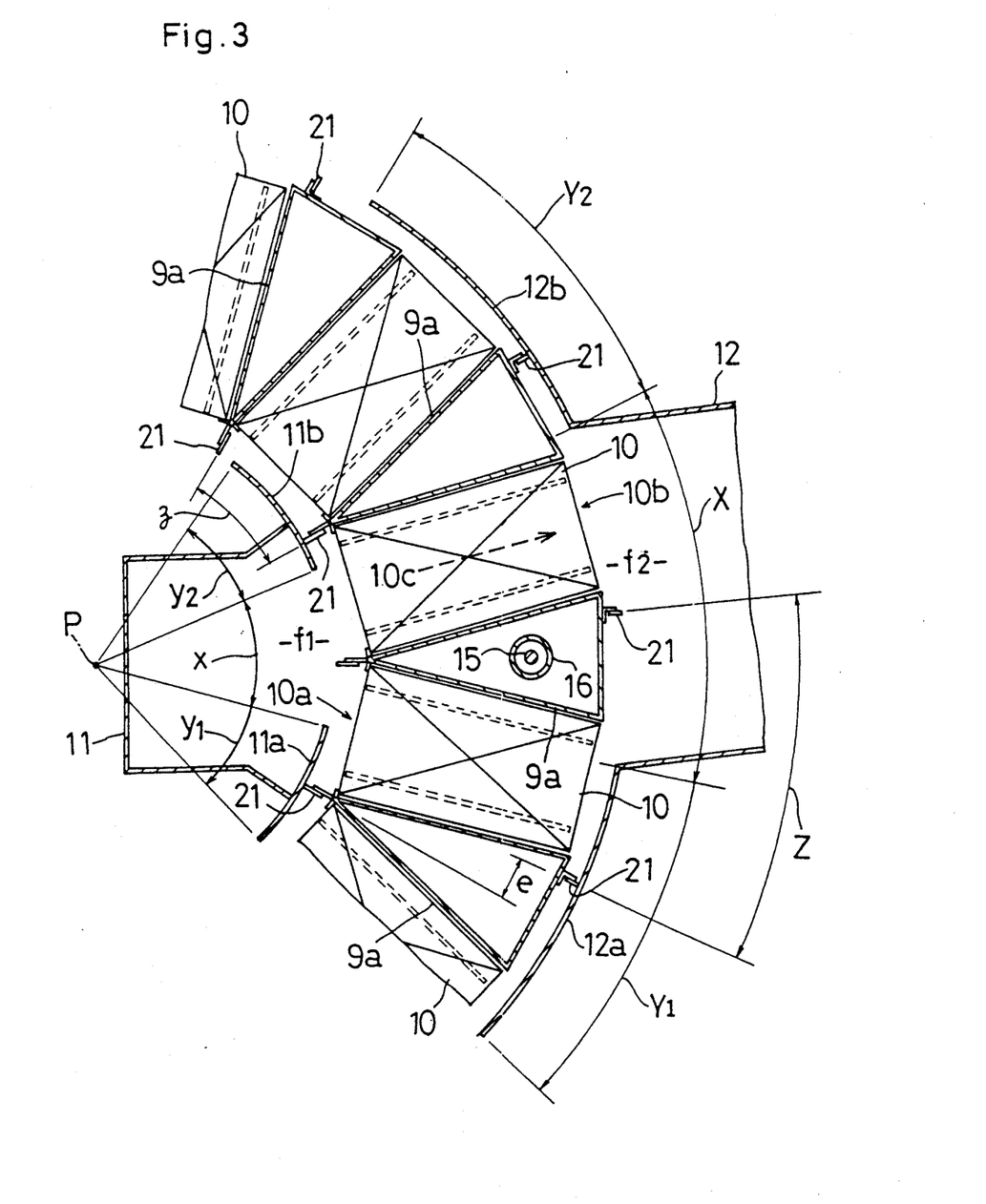
FIG. 3 is an enlarged section of a major portion.
Figure 4:
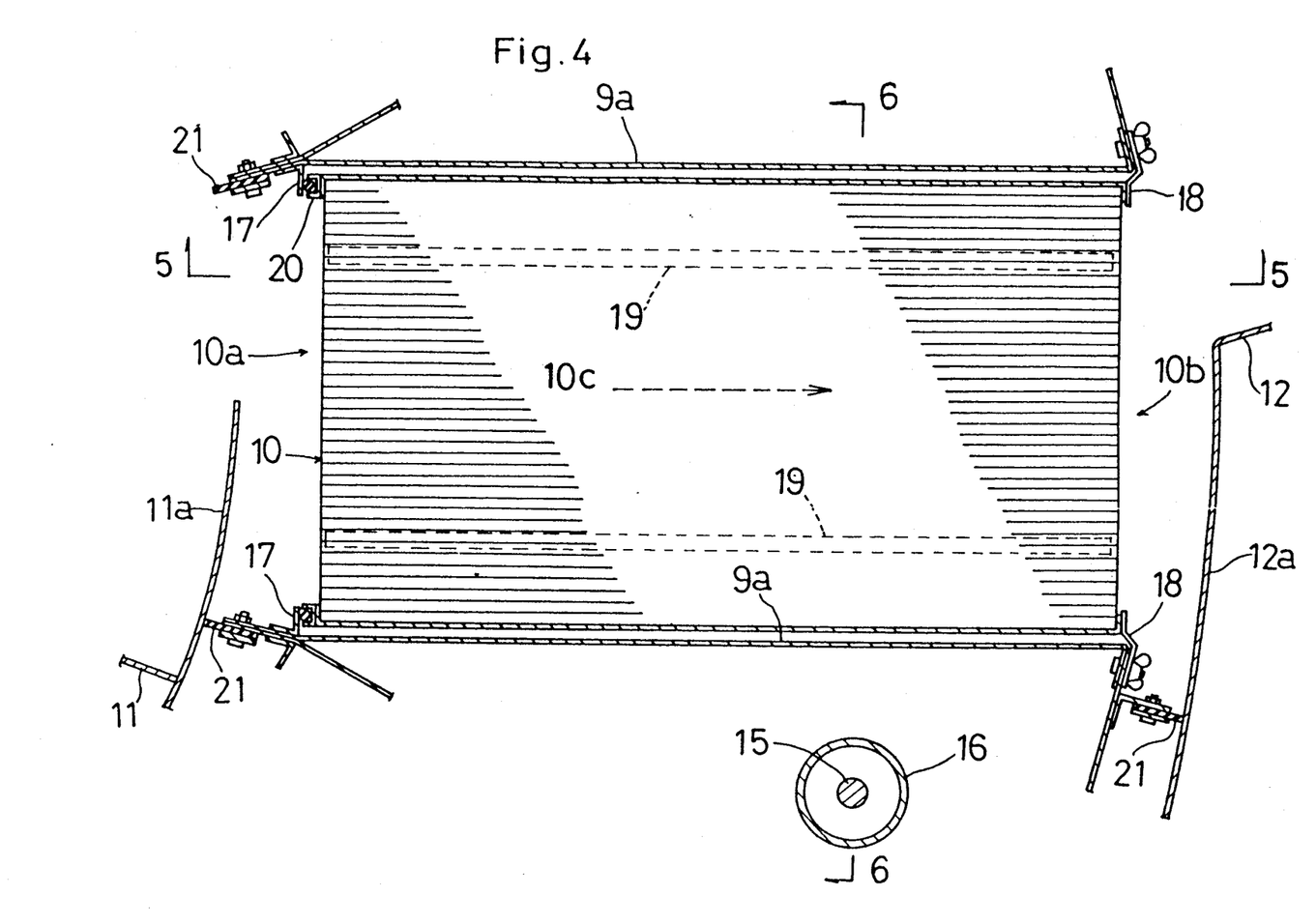
FIG. 4 is a enlarged section showing attachment of element blocks.
Figure 5:
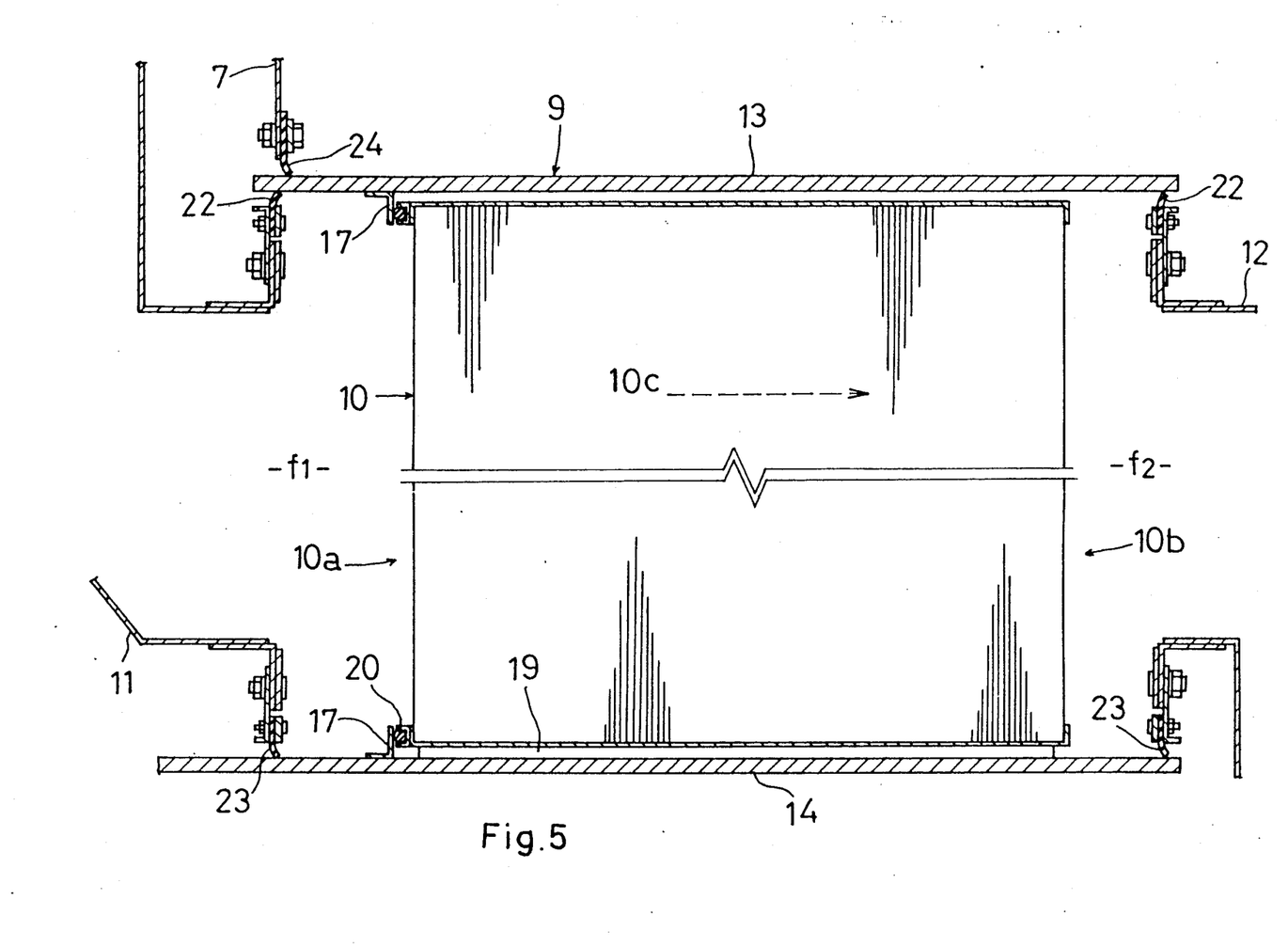
FIG. 5 is a section taken along a line 5—5 of FIG. 4.
Figure 6:
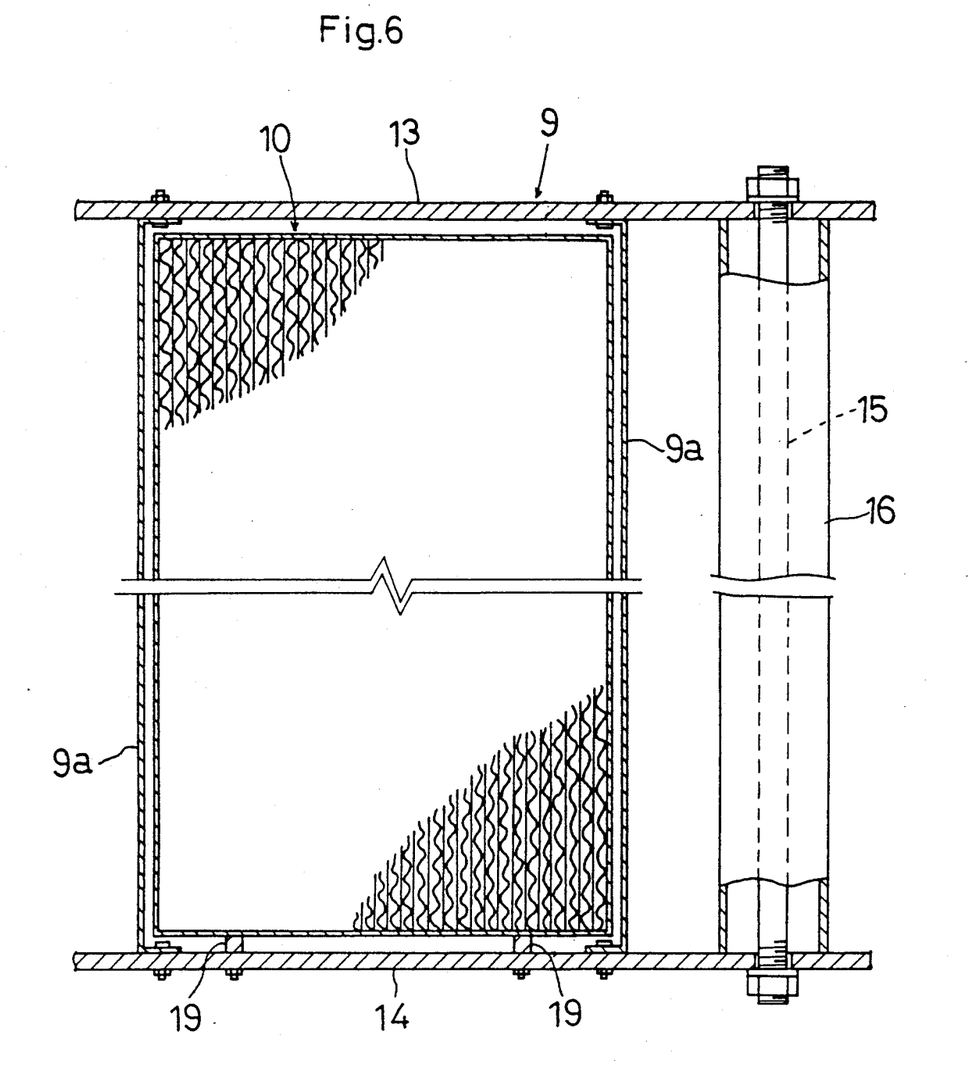
FIG. 6 is a section taken along a line 6—6 of FIG. 4.
Figure 7:
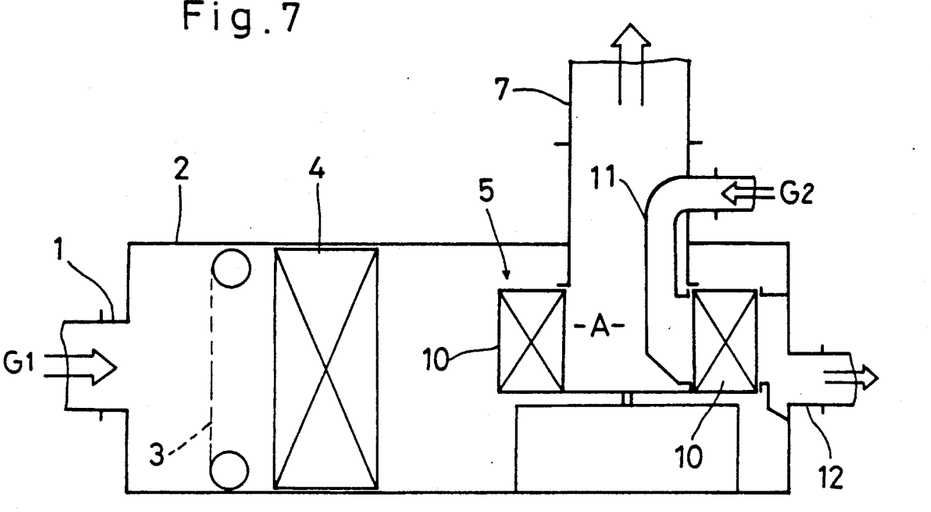
FIG. 7 is a construction view showing an entire gas treating system.

FIG. 7 shows an entire gas treating system in which a gas treating apparatus of the invention is to be used. In operation of this system, a primary gas G1, which is a treatment-target gas, is fed through a first duct 1 into a casing 2. In this casing 2, the gas G1 is caused to pass through a roll filter 3 and then through a dry pack filter 4. After these passages, the gas G1 reaches a cylinder type rotary gas treating apparatus 5. In this apparatus 5, the gas G1 undergoes a dehumidification treatment, deodorization treatment or the like as the same passes through a gas treating flow passage 10c inside an element block 10. After the treatments, the gas is exhausted out of the system through a second duct 7.

Next, the construction of the cylinder type rotary gas treating apparatus 5 of the invention will be particularly described with reference to FIGS. 1 through 6. In this apparatus 5, a casing 2 accommodates therein a rotary frame 9 rotated by a motor 8. The rotary frame 9 holds at peripheral positions thereof a plurality of element blocks 10 for treating the primary gas G1. The element blocks 10 are aligned in the rotational, i.e. peripheral direction of the rotary frame 9, with an orientation of a gas treating flow passage formed in each element block 10 being aligned along the radial direction of the rotary frame 9. A central space A corresponding to a common bore of a cylindrical assembly constituted by the group of these element blocks 10 is gas-tightly communicated with a second duct 7. Further, in order to allow passage of a secondary gas G2, which is the element-refreshing high-temperature gas, only through a particular element block 10 currently positioned in a predetermined rotational phase of the rotary frame 9, in this predetermined rotational phase, an opening f1 of a third duct 11 as a secondary gas feed duct and an opening f2 of a fourth duct 12 as a secondary gas exhaust duct are opposed to each other across the element block 10, with the opening f1 adjacently facing the first opening 10a of the block 10 while the opening f2 adjacently facing the second opening 10b of the same. With the above construction in operation, as the primary gas G1 is fed from the outer periphery of the rotary frame 9 to the central space A through the treating flow passage 10c of the element block 10, the primary gas G1 undergoes the adsorption treatment in the rotational phases of the frame other than the predetermined phase. Simultaneously, as the secondary gas G2 is fed from the central space A to the outer periphery of the frame 9 through the treating flow passage 10c of the particular element block 10 positioned at the predetermined rotational phase, the secondary gas G2 refreshes this element block 10 through its passage by desorption process. With a rotation of the rotary frame 9, these adsorption process of the primary gas G1 and desortion process by the secondary gas G2 take place repeatedly and continuously through the treating flow passages 10c of the element blocks 10. Incidentally, the second duct 7 and the third duct 11 together form a so-called double-duct construction, with the third duct 11 inwardly extending through the second duct 7 to reach the central space A.

The rotary frame 9 is constituted by a plurality of triangular cylindrical frame members 9a equidistantly dispersed in the rotational direction and each member 9a having an isosceles triangle shape when viewed from a rotational axis P, with each top of the isosceles triangle being oriented towards the rotational axis P. Further, the assembly of these frame members 9a is attached with a top plate 13 and a bottom plate 14, thereby forming a rectangular space between an adjacent pair of frames 9a for accommodating the element blocks 10 introduced from the outer periphery of the rotary frame 9. The top plate 13 defines a central opening for communicating with the central space A of the second duct 7. Whereas, the bottom plate 14 is formed as a circular blind plate for closing the bottom of the central space A. Further, these top plate 13 and the bottom plate 14 are rigidly connected with each other by means of a bolt 15 extending between the plates 13, 14 across the interior of the rectangular frame member 9a and also by a pipe frame 16 extending therebetween.

Inside the element block accommodating space, there are provided a stopper 17 for preventing an inadvertent disengagement of the element block 10 into the central space A and a metal securing member 18 for rigidly binding the element block 10 inside the space in cooperation with the stopper 17. Further, in order to regulate the setting level of the element block 10 inside the accommodating space and also to smoothe the insertion of the element block 10, there is provided a rail 19 at the bottom of the accommodating space. The stopper 17 is formed annular so as to come into contact with an entire periphery of the peripheral edge of of the inner edge face (the first opening 10a) of the element block 10 when the same is inserted. Also, the inner edge face of the block 10 includes a rubber packing 20 at its peripheral edge which comes into contact with the stopper 17. Accordingly, the pressure contact between the stopper and the rubber packing 20 provides sealing between the interior face of the accommodating space and the element block 10 accommodated therein.

Next, there will be described the sealing construction for gas-tightly sealing the treating flow passage 10c of the element block 10 and the third and fourth ducts 11 and 12 in the rotational direction. At the third and fourth openings f1 and f2 of the third and fourth ducts 11 and 12 adjacently opposing the first and second openings 10a and 10b of the element block 10, there are provided fixed sealing faces 11a, 11b, 12a and 12b curved substantially along the upper side edge portion and the lower side edge portion in the rotational direction. On the other hand, between respective first opening 10a and second opening 10b of an adjacent pair of element blocks 10, there are respectively provided lip-shaped rubber first sealing members 21 in parallel with the rotational axis P. Accordingly, the sliding contacts between the fixed sealing faces 11a, 11b and the first sealing member 21 provides reliable sealing effect regardless of the rotational angle of the rotary frame 9. More particularly, at the four fixed sealing faces 11a, 11b, 12a and 12b, the first sealing members 21 disposed between the third and fourth openings f1 and f2 and between the adjacent pair of the element blocks 10 positioned close to the same comes into sliding contact with at least one position at the upper and lower sides with respect to the rotational direction and at the first and second openings 10a and 10b, thereby gas-tightly sealing the treating flow passage 10c of the element block and the third and fourth ducts 11 and 12 in the rotational direction of the rotary frame 9. If the rotational-direction-wise length of each of the fixed sealing faces 11a, 11b, 12a and 12b is so predetermined as to exceed the disposing pitch of the first sealing members 21, these fixed sealing faces always come into sliding contact with the first sealing members 21.

Table 1 below shows sample dimensions in terms of angular displacements of the respective elements in order to achieve the above-described gas-tightness in the rotational direction of the rotary frame.

TABLE 1

| the third duct (11) side (inner peripheral side of the rotary frame) | |
|---|---|
| width of third opening | $x = 37.5°$ |
| length of upper side sealing face | $y1 = 32°$ |
| length of lower side sealing face | $y2 = 32°$ |
| disposing pitch of sealing members | $z = 30°$ |

| the fourth duct (12) side (outer peripheral side of the rotary frame) | |
|---|---|
| width of third opening | $x = 37.5°$ |
| length of upper side sealing face | $y1 = 32°$ |
| length of lower side sealing face | $y2 = 32°$ |
| disposing pitch of sealing members | $z = 30°$ |

In positioning the first sealing member 21, its rotational phase relation with respect to each of the fixed sealing faces 11a, 11b, 12a and 12b is set equal to each other in the inner peripheral side and the outer peripheral side of the rotary frame. Incidentally, in the present invention, the attaching phase of the first sealing member 21 at the inner peripheral side of the rotary frame is slightly displaced by an amount e from that at the outer peripheral side of the same in order to further facilitate assembly. However, without this displacement amount e, there would occur substantially no change in the sealing effect of the construction. There is provided a free space of about 50 mm between the fixed sealing faces 11a, 11b, 12a and 12b with respect to the inner frame periphery and the outer frame periphery. As the results, even when the first opening 10a and the second opening 10b come into the same phase as the fixed sealing faces 11a, 11b, 12a and 12b, the gas treating flow passages 10c may be constantly maintained at a good air communication condition. Also, since the widths of the third and fourth openings x and X are set longer than the disposing pitches z and Z of the sealing members, two or three gas treating flow passages 10c are supplied with the gas at the same time, whereby the gas treating operation may be carried out in a stable manner while restricting variations in the gas supply amount with the rotation of the rotary frame.

In order to achieve gas-tightness in the direction of the rotational axis P, at the upper edges of the third and fourth openings f1 and f2 of the third and fourth ducts 11 and 12, there are provided lip-shaped rubber second sealing members 22 which provide a sealing effect when the same come into sliding contact with the top plate 13. Similarly, at the lower edges of the third and fourth openings f1 and f2, there are provided lip-shaped rubber second sealing members 23 which provide a sealing effect when the same come into sliding contact with the bottom plate 14. These sealing members 22 and 23 together provide gas-tightness in the direction of the rotational axis while the first sealing members 21 provide the gas-tightness in the rotational direction of the frame as described hereinbefore. As the results, the treating flow passages 10c and the third and fourth ducts 11 and 12 are sealed from each other in said both directions. Further, in order to establish a gas-tight communication between the second duct 7 and the central space A, there is provided a lip-shaped rubber fourth sealing member 24 which provides the sealing effect as the same comes into sliding contact with the top plate 13 with the rotation of the rotary frame 9, the sealing member 24 being formed annular over the entire periphery of the peripheral edge of the opening end of the second duct 7. Incidentally, these second, third and fourth sealing members 22, 23 and 24 are placed in contact with the top plate 13 or the bottom plate 14 with an initial elastic deformation so as to bias their sliding side ends towards the high-pressure space side. Thereby, the pressure-resistance of the sealing construction is enhanced and at the same time the contact sealing pressure of these members 22, 23 and 24 is enhanced by utilizing the high pressure of the high-pressure space.

ALTERNATE EMBODIMENTS

Some alternate embodiments of the invention will be described next.

In the previous embodiment, the element block 10 forming the gas treating flow passage 10c is constructed as exchangeable. In place of this, various modifications will be apparent for those skilled in the art in the specific construction of the element block 10. Also, the material characteristics of the elements constituting each element block 10 may be conveniently determined with consideration to the type of gas to be treated. Further, 12 units of the elements blocks 10 are used in the previous embodiment. However, if more element blocks are used (e.g. 24 units) to increase the number of gas treating flow passages 10c to be communicated at one time, it becomes possible to further restict the variations in the gas supply amount with the rotation of the rotary frame.

The specific construction of the rotary frame 9 and that of the element block accommodating space of the same may be varied in many ways.

Further, in the previous embodiment, the present invention is used for achieving the gas sealing between the ducts 11, 12 for transporting the element-refreshing gas and the gas treating flow passages 10c of the element blocks 10. Instead, the invention may be utilized for achieving gas sealing of the gas flow passage extending between the duct for transporting the primary gas to the element block 10.

The sealing faces 11a, 11b, 12a and 12b need not necessarily be formed as curved faces but may be formed as straight faces in case the attaching pitch of the first sealing members is smaller.

It is also conceivable to rotate the ducts 11 and 12 while maintaining still the frame 9 carrying the element blocks 10. That is to say, what is meant by 'rotation' in the present invention comprises a relative rotation between the frame and the ducts 11, 12.

The first sealing members 21 may be formed of elastic materials other than the rubber used in the previous embodiment.

Lastly, the cylinder type rotary gas treating apparatus of the invention may be used for treating various kinds of gaseous matters.

What is claimed is:

1. A gas treating apparatus for dehumidifying, deodorizing or heat exchanging including:
    a rotary frame having a pair of spaced apart plates, defining a space therebetween;
    a plurality of frame members mounted to said rotary frame,
    each of said frame members spaced apart to define an accommodating space;
    a gas treating passage through the accommodating space radially supported on said rotary frame;
    means for rotating the frame;
    a plurality of removable element blocks filled with a porous substance;
    means for slidingly accepting and removing said element blocks from the accommodating space including rails mounted on one of said plates;
    said treating passage having a first opening and a second opening through which the treatment-target gas flows to be treated;
    a pair of ducts for transporting the gas or regenerating gas through said element blocks and respectively having a third opening and a fourth opening opposing to each other across the said treating passage;
    said rotary frame being unidirectionally rotatable relating to the pair of ducts;
    said pair of plates movable with respect to ducts;
    a plurality of sealing walls formed substantially along rotatable faces of the first and second openings and positioned on both sides of the third and fourth openings; and
    a plurality of first sealing members attached to each said frame members and disposed between adjacent first openings and between adjacent second openings;
    wherein said each first sealing member comes into sliding contact with one of said sealing walls disposed with both sides in said relative rotational direction and at the sides of said first opening and said second opening, thereby providing gas-tightness with respect to said relative rotational direction between said third and fourth openings and said treating flow passage and said pair of ducts disposed adjacent thereto.

2. A gas treating apparatus of claim 1 wherein said relative rotation of the rotary frame is effected while maintaining still said pair of ducts and said sealing faces.

3. A gas treating apparatus of claim 1, wherein said each first sealing member is formed of a lip-shaped elastic member.

4. A gas treating apparatus of claim 3, wherein said third opening is larger than said first opening of treating passage.

* * * * *